US012810596B2

(12) United States Patent
Wang et al.

(10) Patent No.: US 12,810,596 B2
(45) Date of Patent: Nov. 24, 2026

(54) PERSON RE-IDENTIFICATION METHOD, APPARATUS, AND DEVICE AND STORAGE MEDIUM

(71) Applicant: SUZHOU METABRAIN INTELLIGENT TECHNOLOGY CO., LTD., Suzhou (CN)

(72) Inventors: Li Wang, Suzhou (CN); Baoyu Fan, Suzhou (CN); Zhenhua Guo, Suzhou (CN); Rengang Li, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 241 days.

(21) Appl. No.: 18/712,614

(22) PCT Filed: Aug. 10, 2022

(86) PCT No.: PCT/CN2022/111350
§ 371 (c)(1),
(2) Date: May 22, 2024

(87) PCT Pub. No.: WO2023/201932
PCT Pub. Date: Oct. 26, 2023

(65) Prior Publication Data

US 2025/0014319 A1 Jan. 9, 2025

(30) Foreign Application Priority Data

Apr. 22, 2022 (CN) ......................... 202210424667.9

(51) Int. Cl.
*G06V 10/774* (2022.01)
*G06V 10/80* (2022.01)
*G06V 40/10* (2022.01)

(52) U.S. Cl.
CPC .......... *G06V 10/7753* (2022.01); *G06V 10/80* (2022.01); *G06V 40/10* (2022.01)

(58) Field of Classification Search
CPC .... G06V 10/7753; G06V 10/80; G06V 40/10; G06V 20/52; G06F 18/00; G06N 3/088
See application file for complete search history.

(56) References Cited

U.S. PATENT DOCUMENTS

2018/0204076 A1 7/2018 Tripathi et al.

FOREIGN PATENT DOCUMENTS

CN 108898047 A 11/2018
CN 110263697 A 9/2019
(Continued)

OTHER PUBLICATIONS

Robust contrastive learning using negative samples with diminished semantics. Advances in Neural Information Processing Systems 34 (2021) (Year: 2021).*
(Continued)

*Primary Examiner* — Wassim Mahrouka
(74) *Attorney, Agent, or Firm* — Cooper Legal Group, LLC

(57) ABSTRACT

Disclosed are a person Re-identification (Re-ID) method, apparatus, and device and a storage medium, and the method includes: acquiring a data set, where pieces of data in the data set are unlabeled person images; performing block processing on each piece of data in the data set, performing random ordering on each piece of blocked data to obtain out-of-order data corresponding to each piece of data, and generating negative sample data corresponding to each piece of data based on each piece of data and the corresponding out-of-order data; and performing unsupervised learning based on each piece of data in the data set, the out-of-order data of each piece of data, and the negative sample data of
(Continued)

each piece of data to obtain a corresponding ID network, and performing person Re-ID based on the ID network.

19 Claims, 7 Drawing Sheets

(56) References Cited

FOREIGN PATENT DOCUMENTS

| | | | |
|---|---|---|---|
| CN | 113065516 | A | 7/2021 |
| CN | 113255573 | A | 8/2021 |
| CN | 113822262 | A | 12/2021 |
| CN | 113989835 | A | 1/2022 |
| CN | 114550221 | A | 5/2022 |

OTHER PUBLICATIONS

Transreid: Transformer-based object re-identification. In Proceedings of the IEEE/CVF international conference on computer vision, pp. 15013-15022. 2021 (Year: 2021).*
The English translation of CN 110263697 (Year: 2019).*
Corresponding International Patent Application No. PCT/CN2022/111350, International Search Report, Date Mailed Nov. 30, 2022.
Corresponding International Patent Application No. PCT/CN2022/111350, Written Opinion, Date Mailed Nov. 30, 2022.
Corresponding Chinese Patent Application No. CN202210424667.9, First Office Action dated Jun. 6, 2022.
Corresponding Chinese Patent Application No. CN202210424667.9, Grant Notification dated Jun. 22, 2022.
Dai, Yongxing et al., "Bridging the Source-to-target Gap for Cross-domain Person Re-Identification with Intermediate Domains", arXiv,Mar. 3, 2022, pp. 1-17.

* cited by examiner

PERSON RE-IDENTIFICATION METHOD, APPARATUS, AND DEVICE AND STORAGE MEDIUM

CROSS-REFERENCE TO RELATED APPLICATION

This application is the national phase application of International Application No. PCT/CN2022/111350, filed Aug. 10, 2022, which claims priority to Chinese Patent Application No. 202210424667.9, filed on Apr. 22, 2022 in China National Intellectual Property Administration and entitled "Person Re-identification Method, Apparatus, and Device and Storage Medium". The contents of International Application No. PCT/CN2022/111350 and Chinese Patent Application No. 202210424667.9 are incorporated herein by reference in their entireties.

FIELD

The present application relates to a person Re-identification (Re-ID) method, apparatus, and device and a storage medium.

BACKGROUND

Person Re-ID is an important image identification technology widely used in public security systems, traffic supervision, and other fields. Person Re-ID determines whether persons in different camera views are the same by searching for cameras distributed at various locations. The inventors have realized that in some scenes of person Re-ID, there are many persons, and the massive data formed by person images needs to be labeled individually, which will result in a significant workload and may even be unrealizable. Therefore, reducing the workload required for person Re-ID is currently an urgent problem to be addressed by the skilled in the art.

SUMMARY

According to various embodiments disclosed in the present application, a person Re-ID method, apparatus, and device and a storage medium are provided.

A person Re-ID method includes:

acquiring a data set, where pieces of data in the data set are unlabeled person images;

performing block processing on each piece of data in the data set, performing random ordering on each piece of blocked data to obtain out-of-order data corresponding to each piece of data, and generating negative sample data corresponding to each piece of data based on each piece of data and the corresponding out-of-order data; and performing unsupervised learning based on each piece of data in the data set, the out-of-order data of each piece of data, and the negative sample data of each piece of data to obtain a corresponding ID network, and performing person Re-ID based on the ID network.

A person Re-ID apparatus includes:

an acquisition module, configured to acquire a data set, where pieces of data in the data set are unlabeled person images;

a processing module, configured to perform block processing on each piece of data in the data set, perform random ordering on each piece of blocked data to obtain out-of-order data corresponding to each piece of data, and generate negative sample data corresponding to each piece of data based on each piece of data and the corresponding out-of-order data; and a training module, configured to perform unsupervised learning based on each piece of data in the data set, the out-of-order data of each piece of data, and the negative sample data of each piece of data to obtain a corresponding ID network, and perform person Re-ID based on the ID network.

A person Re-ID device includes:

a memory, configured to store computer-readable instructions; and a processor, configured to implement any step of the person Re-ID method as described above when executing the computer-readable instructions.

A computer-readable storage medium stores thereon computer-readable instructions that, when executed by a processor, implement any step of the person Re-ID method as described above.

The details of one or more embodiments of the present application are outlined in the drawings and the description below, and other features and advantages of the present application will be apparent from the specification, drawings, and claims.

BRIEF DESCRIPTION OF THE DRAWINGS

To explain the embodiments of the present application or the technical solutions in the prior art more clearly, a brief introduction will be made to the drawings used in the embodiments or the description of the prior art. It is obvious that the drawings in the description below are only some embodiments of the present application, and those ordinarily skilled in the art can obtain other drawings according to these drawings without creative work.

DETAILED DESCRIPTION

Figure 1:
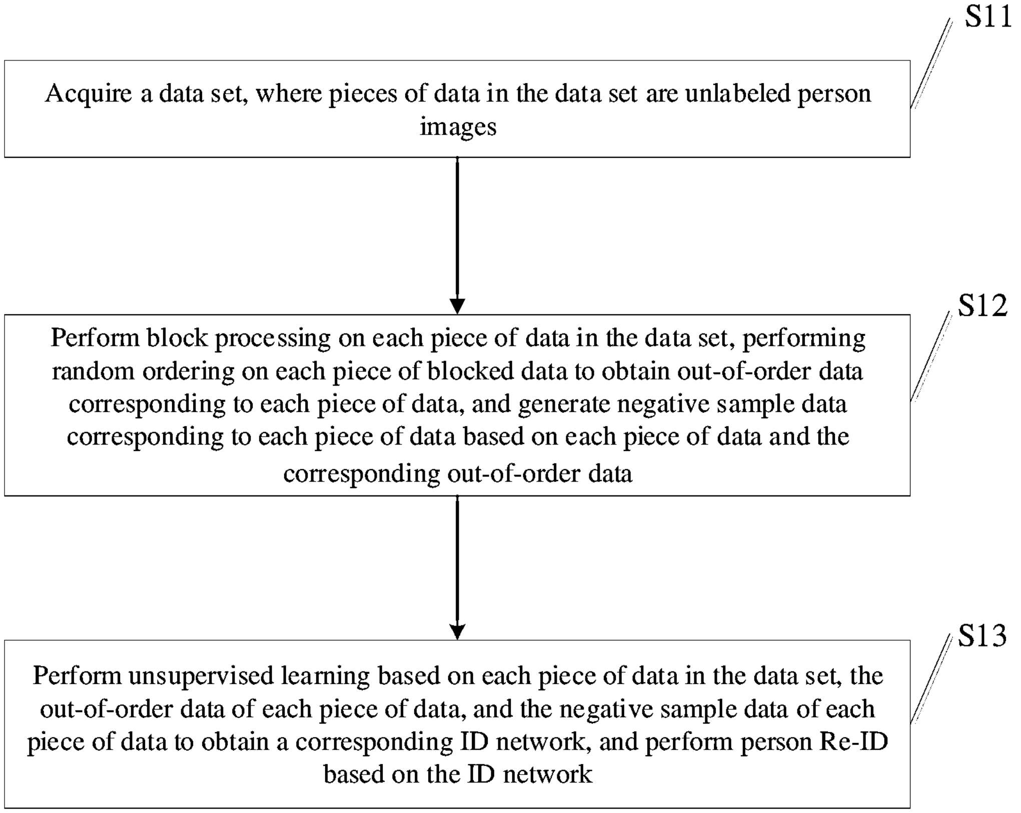
FIG. 1 is a flowchart of a person Re-ID method provided by an embodiment of the present application.

The technical solutions in the embodiments of the present application will be described clearly and completely below in combination with the drawings in the embodiments of the present application. The described embodiments are not all but only part of the embodiments of the present application. All other embodiments obtained by those ordinarily skilled in the art based on the embodiments in the present application without creative work shall fall within the scope of protection of the present application. Referring to FIG. 1, a flowchart of a person Re-ID method provided by an embodiment of the present application is shown, which may in some embodiments include:

S11: Acquire a data set, where pieces of data in the data set are unlabeled person images.

Unsupervised learning uses a large number of unlabeled data for pattern identification, therefore, the application of unsupervised learning to person Re-ID might both ensure the identification accuracy of persons and greatly reduce the workload.

The embodiments of the present application acquire the unlabeled data set represented as N; all the pieces of data in N are unlabeled person images; $N_i$ represents a certain piece of data in N; $i \in [1,T]$ represents the $i^{th}$ piece of data in N, and there are T pieces of data in N.

S12: Perform block processing on each piece of data in the data set, perform random ordering on each piece of blocked data to obtain out-of-order data corresponding to each piece of data, and generate negative sample data corresponding to each piece of data based on each piece of data and the corresponding out-of-order data.

The arbitrary data in the data set is subjected to block processing, and then various blocked parts are subjected to random ordering to obtain out-of-order data of the arbitrary data. The original data and the corresponding out-of-order data constitute a pair of positive sample data. The arbitrary data and the out-of-order data of the arbitrary data are further mixed to generate corresponding negative sample data. The embodiments of the present application may take each piece of data in the data set and the corresponding out-of-order data as positive sample data to enable unsupervised learning based on each piece of positive sample data and the corresponding negative sample data.

S13: Perform unsupervised learning based on each piece of data in the data set, the out-of-order data of each piece of data, and the negative sample data of each piece of data to obtain a corresponding ID network, and perform person Re-ID based on the ID network.

Figure 2:
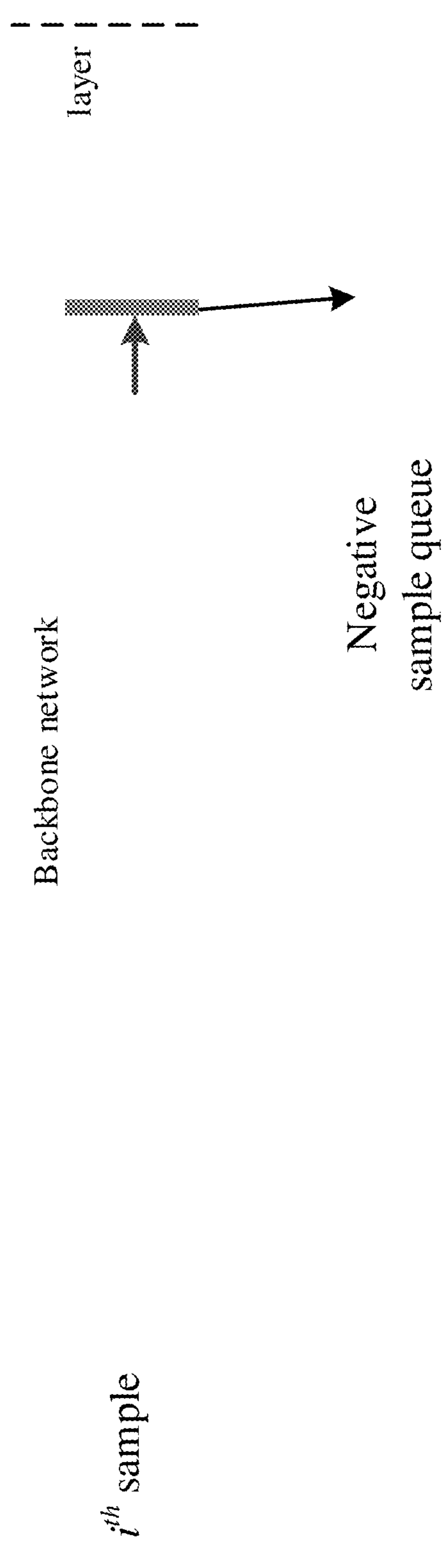
FIG. 2 is a structural diagram of an ID network in a person Re-ID method provided by an embodiment of the present application.

A structure diagram of an ID network in an embodiment of the present application might be shown in FIG. 2 (where the sample is data, and the negative sample queue is the contrastive sample queue), and the backbone network used is not in some embodiments defined herein. Unsupervised learning is performed based on each piece of positive sample data and corresponding negative sample data to obtain the ID network. After unsupervised learning (namely, network training) is completed, various weights obtained by unsupervised learning are saved, and then when using the ID network to realize person Re-ID, various saved weights are loaded to perform final matching on the person images.

Figure 3:
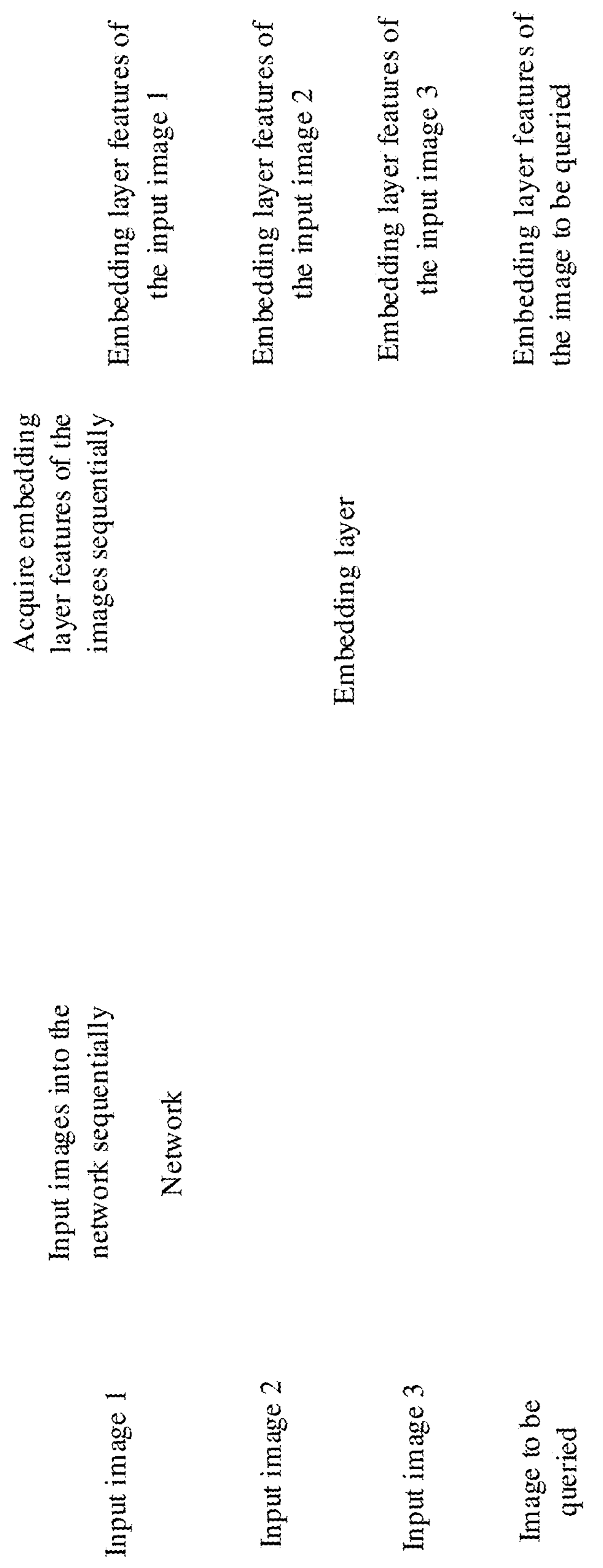
FIG. 3 is a person Re-ID application diagram in a person Re-ID method provided by an embodiment of the present application.

Taking FIG. 3 as an illustration for a routine person Re-ID application, input images 1, 2, and 3 are input into the ID network, where the network may include a convolutional layer (Conv layer), a bottleneck layer, an fully connected layer (FC layer), and an embedding layer; the embedding layer features in the ID network are acquired, and the embedding layer features of the images 1, 2, and 3 constitute a query data set of a person Re-ID task; an image to be queried is input into the ID network to acquire embedding layer features of the image to be queried; the embedding layer features of the image to be queried are compared with all the features in the query data set, where the comparison method is to calculate the distance between the embedding layer features of the image to be queried and all the features in the query data set, namely, calculating the distance between eigenvectors; and it is determined that the image corresponding to the feature in the query data set with the minimum distance is the same person as the image to be queried.

In the embodiments of the present application, after acquiring a data set containing unlabeled person images, each piece of data in the data set is subjected to block processing and random ordering to obtain out-of-order data corresponding to each piece of data; corresponding negative sample data is generated based on each piece of data in the data set and the corresponding out-of-order data; unsupervised learning is performed based on the corresponding negative sample data and the positive sample data composed of each piece of data in the data set and the corresponding out-of-order data, to obtain the ID network, realizing person Re-ID based on the ID network. It might be seen that the embodiments of the present application might automatically generate corresponding out-of-order data and negative sample data based on the unlabeled person images, and then perform unsupervised learning based on the unlabeled person images, the out-of-order data, and the negative sample data to obtain the ID network, realizing person Re-ID using the ID network without labeling massive data, thereby ensuring the accuracy of person Re-ID while effectively reducing the workload of person Re-ID and improving the efficiency of person Re-ID.

For the person Re-ID method provided by the embodiments of the present application, the performing block processing on each piece of data in the data set may include: performing block processing on each piece of data in the data set according to a height dimension of a person according to a preset proportion, whereby the head, upper limb, and lower limb of the person in the corresponding data are located at different blocks.

Before the performing block processing on each piece of data in the data set, the method further includes: performing data augmentation processing on each piece of data in the data set.

Figure 4:
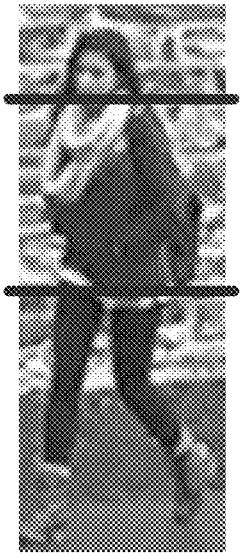
FIG. 4 is a block diagram of a person Re-ID method provided by an embodiment of the present application.
Figure 5:
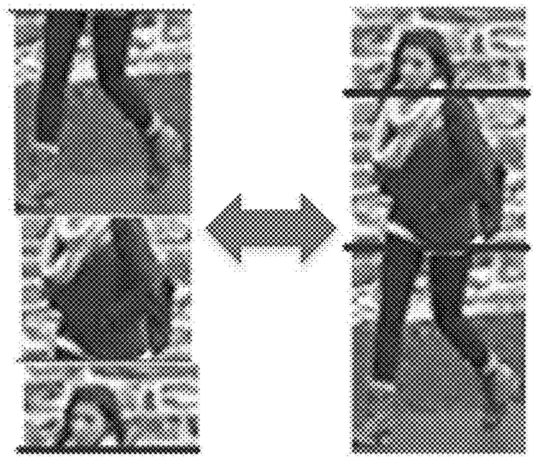
FIG. 5 is a diagram of data and corresponding out-of-order data in a person Re-ID method provided by an embodiment of the present application.

In the embodiments of the present application, when the training of the unsupervised learning is performed, one batch of data might be extracted from the data set N every iteration; corresponding out-of-order data and negative sample data are generated based on the extracted data; and then current iterative training is implemented based on the extracted data, the corresponding out-of-order data, and the corresponding negative sample data. The specific value of the batch might be set according to actual needs, for example, extracting 4 pieces of data to constitute a batch. The current extracted data is subjected to data augmentation processing after each extraction of one batch of data. Methods for data augmentation processing include but are not limited to adding noise, rotation, blurring, and deduction. After the current extracted data is subjected to data augmentation processing, the augmented data might be subjected to block processing in proportion according to the height dimension of the person. In the embodiments of the present application, the blocking proportion might be 2:3:5 with 3 blocks in total, whereby each blocked part of a single piece of data includes the head, the upper limb, and the lower limb of the person in the data, for example, as shown in FIG. 4; then the blocked data is subjected to random ordering to obtain corresponding out-of-order data, for example, as shown in FIG. 5; the resulting data and the corresponding out-of-order data constitute a positive sample pair, that is, a piece of positive sample data. Through data augmentation processing, blocking, ordering, and other processing on data, the present application makes the subsequently learned data features more comprehensive and accurate, thereby helping to improve the accuracy of person Re-ID.

For the person Re-ID method provided by the embodiments of the present application, the generating negative sample data corresponding to each piece of data based on each piece of data and the corresponding out-of-order data may include:

generating the negative sample data corresponding to each piece of data according to the following formulas:

$$f_i = \alpha \cdot f_i^p + \beta \cdot f_i^I + \eta \cdot f^c;$$

$$f^c = \frac{1}{K}\sum_{i=1}^{K} f_i;$$

$$\alpha + \beta + \eta = 1;$$

$$\eta = \cos(iter/\text{sum\_iter}),$$

where i represents an $i^{th}$ piece of data; α, β, and η represent weight parameters;

$$f_i^p$$

represents data features of the $i^{th}$ piece of data;

$$f_i^t$$

represents data features of the out-of-order data of the $i^{th}$ piece of data; $f^c$ represents central sample features; $f_i$ represents negative sample data of the $i^{th}$ piece of data; iter represents the current number of iterations; sum_iter represents the total number of iterations; and K represents the amount of data for calculating the negative sample data.

In the embodiments of the present application, the features of the negative sample data are multi-fused, which are derived from the features of the original data, the features of the out-of-order data, and the central sample features, and these features are weighted to obtain the negative sample data. It should be noted that, in the embodiments of the present application, α, β, and η belong to the model weights, whose values are not fixed, but may change as the model training progresses. In the early stage of training, the weight values of the neural network (NN) model are initialized randomly, which results in the positive sample data and the negative sample data being in a disordered state in the eigenspace, that is, simply speaking, the feature distance between positive sample pairs is not necessarily close, and the feature distance between negative sample pairs is not necessarily far. This disorder state makes the model difficult to converge at the beginning of training. The embodiments of the present application add a central sample feature and a weight η corresponding to the feature in the negative sample data, where the feature is obtained by averaging K pieces of negative sample data participating in the calculation, and the weight is the maximum at the first iteration and decreases as the number of iterations increases. This is because at the beginning of training, setting a larger weight for the central sample feature might ensure that the central sample feature plays a dominant role in the negative sample data, further effectively reducing the disorder of negative sample data in the eigenspace at the beginning of training and accelerating the model convergence. With the training iteration, the network model gets more and more accurate features. To avoid the influence of the central sample features on the accuracy of the network model, the proportion of the central sample features in negative sample data should be reduced. In other words, the weights of the central sample features should decrease as the number of iterations increases. In other words, the embodiments of the present application provide a central sample exit mechanism, where the formula for decreasing the weights of the central sample features is η=cos(iter/sum_iter). The mechanism might ensure that the value of negative sample data is related to the number of training iterations and the central sample through weight control, and the calculation of the negative sample feature mainly originates from the central sample features in the early stage of training, while the feature pressed into the negative sample queue mainly originates from the negative sample features of each sample in the late stage of training as the number of training increases, thereby effectively improving the iteration rate in the early stage of model training and suppressing the influence of the central sample features on the accuracy of the model in the late stage of training. Of course, based on the same idea, a similar exit mechanism might also be set for the positive samples, that is, the weights of the positive sample features decrease as the number of iterations increases. The weight decrease might be achieved by e-exponential reduction or cosine reduction, which will not be described in detail herein. Briefly, the negative samples in the embodiments of the present application are composed of multi-structure samples (different from the existing solutions), and all the multi-structure samples might be provided with an exit mechanism, and the corresponding weight thereof might gradually decrease as the number of iterations increases.

After the generating negative sample data corresponding to each piece of data based on each piece of data and the corresponding out-of-order data, the method further includes: adding the newly generated negative sample data to a contrastive sample queue, the contrastive sample queue being a First-In-First-Out (FIFO) stack with a length of K.

One batch of data might be extracted from the data set N every iteration.

The embodiments of the present application successively input each piece of data in the data set and the corresponding out-of-order data into the ID network for training (as shown in FIG. 2), to acquire the embedding layer features of each piece of data and the corresponding out-of-order data as the data features of the corresponding data or the out-of-order data. Assuming that the $i^{th}$ piece of data and the corresponding out-of-order data pass through the network to obtain the corresponding two data features $$f_i^p$$

and $$f_i^t,$$

respectively, the two data features may also be referred to as corresponding positive sample pairs. After the training starts, the contrastive sample queue might be established, and the contrastive sample queue is a FIFO stack with a length of K; then, for the one batch of data extracted from the data set in the current iteration training, the first K pieces of data are subjected to the calculation of the following formula to obtain the corresponding negative sample data:

$$f_i = \alpha \cdot f_i^p + \beta \cdot f_i^I + \eta \cdot f^c, \text{ where } \alpha + \beta + \eta = 1,$$

where i represents the $i^{th}$ piece of data in the data set; the features of the $i^{th}$ piece of data $$f_i^p,\ f_i^t, \text{ and } f^c$$

are weighted to obtain corresponding negative sample data, namely, being one sample in the contrastive sample queue. K pieces of negative sample data are obtained through K calculations on the above K pieces of data, and the K pieces of negative sample data are input into the contrastive sample queue. One piece of data is extracted from one batch of data of the current iterative training each time, and the corresponding negative sample data of the data is extracted from the contrastive sample queue at the same time (after extracting the corresponding negative sample data of the data from the contrastive sample queue, the corresponding negative sample data of the data no longer exists in the contrastive sample queue), then the data, the out-of-order data of the data, and the negative sample data of the data is input into the ID network for training, and after the training is completed, the next piece of data is extracted from one batch of data of the current iterative training, until one batch of data of the current iteration training is all input to the ID network for training. In addition, while the above training is implemented, the calculation of negative sample data will continue to be implemented, namely, after the negative sample data of the first K pieces of data in the one batch of data of the current iterative training is calculated and input into the contrastive sample queue, the negative sample data of the $(K+1)^{th}$, $(K+2)^{th}$ . . . $(K+n)^{th}$ (K+n is the total number of a single batch of data) piece of data in the one batch of data of the current iterative training will continue to be calculated; after every piece of negative sample data is calculated, the negative sample data is input into the contrastive sample queue (in the case where there is a position in the contrastive sample queue, or where the negative sample data calculated and input into the contrastive sample queue at the earliest may be pressed out of the contrastive sample queue to obtain the corresponding position).

The embodiments of the present application are unsupervised learning; the positive sample data and all the negative sample data in the contrastive sample queue are obtained for contrastive loss. Since the ID network is initially a randomly initialized weight, the features of the positive sample data are not necessarily close, and the features of the negative sample data are not necessarily far, resulting in the positive sample data and the negative sample data being in a disordered state, whereby $f^c$ is added to the calculation of the negative sample data, which might be referred to as the central sample feature. In the early stage of training, the central sample features occupy a large weight, and with the training iteration, the network gets more and more accurate features, and $f^c$ feature will gradually decrease. The specific calculation formula of $f^c$ is as follows:

$$f^c = \frac{1}{K}\sum_{i=1}^{K} f,$$

where η=cos (iter/sum_iter); iter represents the current number of iterations; and sum_iter represents the total number of iterations. In addition, since there are no K pieces of negative sample data in the early stage of training, $f^c$ might not be calculated according to the above formula, and a preset value might be assigned to $f^c$ at this moment. Therefore, the solution method and attenuation method of $f^c$ are conducive to the fast convergence of the network.

For the person Re-ID method provided by the embodiments of the present application, the performing unsupervised learning based on each piece of data in the data set, the out-of-order data of each piece of data, and the negative sample data of each piece of data may include:

calculating a loss function loss according to the following formula during the unsupervised learning:

$$\text{loss} = -\sum_{i=1}^{Batchsize} \log \frac{\exp(f_i^t \cdot f_i^p/\tau)}{\exp(f_i^t \cdot f_i^p/\tau) + \sum_{k=1}^{K}\exp(f_i^t \cdot f_k/\tau)},$$

where Batchsize represents the batch, that is, the amount of data used in every single iteration taken from the data set; k represents a $k^{th}$ piece of data in the first K pieces of data of the data used in the current iteration; $f_k$ represents the negative sample data of the $k^{th}$ piece of data in the first K pieces of data of the data used in the current iteration; and τ represents a proportional parameter.

In the embodiments of the present application, after the construction of the contrastive sample queue is completed, real network training is started; the loss function may be calculated in the following formula:

$$\text{loss} = -\sum_{i=1}^{Batchsize} \log \frac{\exp(f_i^t \cdot f_i^p/\tau)}{\exp(f_i^t \cdot f_i^p/\tau) + \sum_{k=1}^{K}\exp(f_i^t \cdot f_k/\tau)}.$$

The embodiments of the present application learn all the unlabeled data through the above loss function until all the data have been iterated; in addition, each time the loss is calculated, the weights in the ID network will be updated through loss back-propagation, whereby the model accuracy of the ID network is increasingly improved.

The person Re-ID method provided by the embodiments of the present application, after the obtaining a corresponding ID network, may further include:

acquiring loss values corresponding to the ID network in the latest preset number of training iterations, and calculating an average value of the loss values;

extracting, in response to determining that the average value is less than a preset threshold, data features of each piece of data in the data set using the ID network;

performing clustering on the data features of each piece of data in the data set using mean shift clustering, and performing classification on the data in the data set based on results of the clustering; and determining an extracted probability of each piece of data in the data set based on results of the classification, and extracting data from the data set based on the extracted probability to continue training the ID network.

The determining an extracted probability of each piece of data in the data set based on results of the classification may include:

calculating the extracted probability of each piece of data in the data set according to the following formula:

$$P_j = -\frac{1}{2}\log\left(1 - \frac{d_c^j}{D_c}\right),$$

where c represents a $c^{th}$ category obtained by classification; j represents a $j^{th}$ piece of data in the $c^{th}$ category; $P_j$ represents an extracted probability of the $j^{th}$ piece of data in the $c^{th}$ category; $D_c$ represents the distance between the data farthest away from a cluster center and the cluster center in the $c^{th}$ category; and $$d_c^j$$

represents the distance between the $j^{th}$ piece of data and the cluster center in the $c^{th}$ category; and normalizing the calculated extracted probability of each piece of data in the data set.

It might be understood that, although unsupervised learning usually uses massive data for training, the training difficulty of each piece of data in the training set is different, and the distribution of the data with different training difficulties in the training set is also different, which easily results in that the model is difficult to effectively train the data with different training difficulties. In a general training set, it usually contains the most common data that is easy to train and a little difficult data that is difficult to train. Since the number of difficult data is small, the training effect of the ID network on this part of the data is poor, and it is difficult to achieve a good effect when recognizing such difficult data. Therefore, the difficult data in the training set should be selected, and then the ID network should be trained with the difficult data to improve the identification effect of the model on the difficult data. Based on this, the embodiments of the present application provide a sample selector for screening difficult data. The sample selector might increase the training opportunity of the difficult data, to make the ID network contact more difficult data, further promoting the convergence of the ID network and improving the network performance. Furthermore, the total number of training data might be reduced through data screening, the training time might be greatly reduced, and better results might be achieved under the same training time, which has great advantages for unsupervised training on massive data.

Of course, before describing the sample selector, the embodiments of the present application should note that the selector should be used in the later stage of training of the ID network model. In other words, the embodiments of the present application may perform multi-stage training on the ID network. In some embodiments, in the first stage, the embodiments of the present application will train the ID network with the full data to ensure that the model covers most of the easily recognizable data in the training set. However, when the identification effect of the network on the training set is relatively accurate, the second stage might be entered, namely, firstly using the sample selector provided in the embodiments of the present application to select a difficult sample and using the difficult sample to train again. The accuracy detection of the ID network in the embodiments of the present application is performed according to the loss values generated by the network in the iterative training process, namely, the embodiments of the present application would acquire the loss values generated by the ID network in the latest preset number of iterations, calculate the average value of these loss values, and finally determine that the accuracy of the ID network meets the requirements when it is determined that the average value is less than a preset threshold value. For example, if the ID network has been trained a total of 100 times in the first stage, and the preset number is 10, then the embodiments of the present application would take all the loss values generated in the $91^{st}$ to $100^{th}$ iterations of the network to perform an average calculation to determine the accuracy of the ID network. It should be noted that the embodiments of the present application do not define the specific numerical values of the preset number and the preset threshold, and might be set according to practical application requirements.

In some embodiments, the data screening method of the sample selector may include:

(A) The ID network obtained by the unsupervised learning has been trained to a better state, using the ID network obtained by the unsupervised learning to extract the data features of all the data in the data set, recorded as $$f_i^t,\ i \in [1, T].$$

Figure 6:
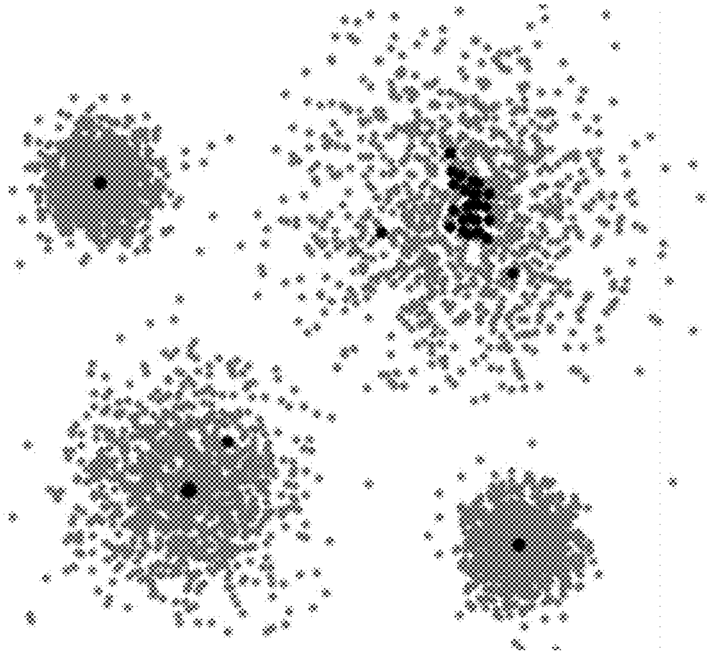
FIG. 6 is a diagram of results of clustering in a person Re-ID method provided by an embodiment of the present application.

(B) The mean shift clustering is used to cluster the data features of all the data in the data set. The mean shift clustering is to find the dense region of data points (data features) based on the sliding window algorithm, which is a centroid-based algorithm. By updating the candidate points of the central point to the mean of the points in the sliding window to locate the central point of each class, and then removing the similar windows of these candidate windows, finally forming the central point set and the corresponding grouping. Thus, only the vector of the central point and the clustering radius need to be set, and the algorithm might automatically generalize and classify without determining the number of classes to be clustered. The clustering step in the embodiments of the present application may include:

1. determining a radius of the sliding window r, and starting sliding with a randomly selected circular sliding window with the central point C and the radius r, where the mean shift is similar to a hill-climbing algorithm, moving to a region with higher density in each iteration until convergence;
2. calculating a mean within the sliding window as a central point in response to sliding to a new area each time, where the number of points within the sliding window is the density within the window; in addition, in each movement, the window will move to the region with higher density;
3. moving the window, calculating the central point within the window and the density of the data points within the window, until there is no direction within the window that might accommodate more points, namely, moving until the density in the circle no longer increases; and 4. many sliding windows being generated in steps 1 to 3, retaining, in response to a plurality of sliding windows overlapping, the window containing the most points; and then performing clustering according to the sliding window where the data points are located, where the obtained result may be as shown in FIG. 6.

(C) All data categories are subjected to classification according to each cluster center to obtain data of a plurality of categories; the classification method uses nearest neighbor clustering, that is, judging which cluster center the data is close to, and which kind the data belongs to.

Figure 7:
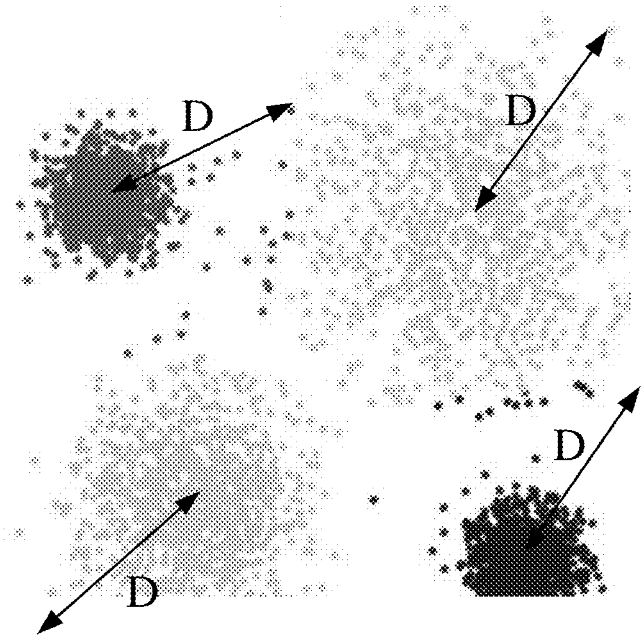
FIG. 7 is a diagram of the furthest distance of a category in a person Re-ID method provided by an embodiment of the present application.

After realizing the above clustering, the extracted probability of each piece of data at the next training might be calculated, and the specific implementation steps might include: traversing the data of all the categories to obtain the farthest distance of each category (as shown in FIG. 7), namely, for the data of an arbitrary category, calculating the distance of the data farthest from the cluster center of the arbitrary category as the farthest distance of the arbitrary category, recorded as $D_c$ (namely, D in FIG. 7), and the subscript c represents the $c^{th}$ category; calculating the extracted probability of the $j^{th}$ piece of data in the $c^{th}$ category according to the formula for calculating the extracted probability:

$$P_j = -\frac{1}{2}\log\left(1 - \frac{d_c^j}{D_c}\right),$$

where c represents a $c^{th}$ category obtained by classification; j represents a $j^{th}$ piece of data in the $c^{th}$ category; P represents an extracted probability of the $j^{th}$ piece of data in the $c^{th}$ category; D represents the distance between the data farthest away from a cluster center and the cluster center in the $c^{th}$ category;

$$d_c^j$$

represents the distance between the $j^{th}$ piece of data and the cluster center in the $c^{th}$ category; and normalizing the P values of all data.

It is worth noting that the probability is proportional to the distance between the data and the cluster center, that is, the larger the distance, the higher the probability. This is because the distance reflects the ability of the ID network to extract features of each piece of data, and when the distance is greater, it indicates that the network has a weaker ability to extract features of corresponding data, that is, it indicates that the data is difficult data for the network and should be trained by the network; on the contrary, it indicates that the data belongs to common data, and the chance of being trained by the network should be reduced. Thus, for data with greater distance, a greater probability should be set to increase the probability that the data will be trained by the network.

After calculating the extracted probability of each piece of data in the data set, each piece of data in the data set is extracted according to the probability of each piece of data before continuing to train the ID network. For example, in the second round of training, ½ of all data will be extracted. Due to the advantages of the algorithm, the data far from the center will be extracted with a high probability, while the sample near the center will be extracted with a small probability.

The embodiments of the present application might make the proportion of data far from the cluster center greater in this round of training, thereby increasing the training difficulties, further improving the network accuracy, reducing the amount of data for training, and reducing the total training time.

In a specific implementation, the person Re-ID method provided by the embodiments of the present application may in some embodiments include the following steps:

(1) obtaining unlabeled data set, recorded as N;

(2) extracting one batch of data from the data set N, performing data augmentation processing on the extracted data, and then performing block processing and random ordering on each piece of data after the data augmentation processing to obtain corresponding out-of-order data;

(3) inputting each piece of data in the data set and the corresponding out-of-order data into the ID network successively for training, and acquiring each piece of data and the embedding layer features of each piece of out-of-order data as the corresponding data feature;

(4) first establishing a contrastive sample queue at the beginning of training, calculating negative sample data of the first K pieces of data in the current extracted data, and inputting the K pieces of negative sample data into the contrastive sample queue, where the contrastive sample queue is a FIFO stack, after which each piece of data is input into the contrastive sample queue during training, and the earliest calculated negative sample data is pressed out of the contrastive sample queue;

(5) performing network training after the completion of constructing the contrastive sample queue; calculating a loss function, and learning all the unlabeled data through the loss function until all the data have been iterated; in addition, updating, each time the loss function is calculated, the weights of the ID network through the back-propagation of the loss function, whereby the network accuracy will be improved continuously;

(6) performing, in response to the ID network being trained to a better state in the previous five steps, data screening on the data in the data set using the trained ID network in this step, to obtain the extracted probability of each piece of data in the data set, and then realizing the data extraction and the continuous training on the ID network based on the probability.

In the present application, the unlabeled data is first processed, and the network is trained using the processed data, and at the same time, more effective data might be screened in the training process to improve the network training efficiency. Therefore, applying unsupervised learning to person Re-ID, might not only ensure the accuracy of person identification but also greatly reduce the workload.

Figure 8:
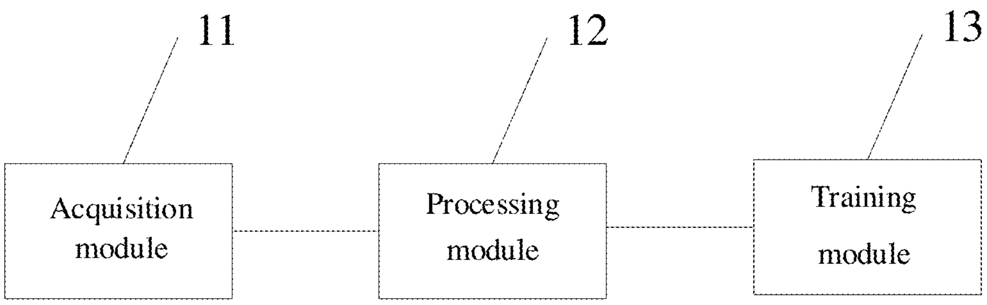
FIG. 8 is a structural diagram of a person Re-ID apparatus provided by an embodiment of the present application.

The embodiments of the present application further provide a person Re-ID apparatus, as shown in FIG. 8, which may include:

an acquisition module 11, configured to acquire a data set, where pieces of data in the data set are unlabeled person images;

a processing module 12, configured to perform block processing on each piece of data in the data set, perform random ordering on each piece of blocked data to obtain out-of-order data corresponding to each piece of data, and generate negative sample data corresponding to each piece of data based on each piece of data and the corresponding out-of-order data; and a training module 13, configured to perform unsupervised learning based on each piece of data in the data set, the out-of-order data of each piece of data, and the negative sample data of each piece of data to obtain a corresponding ID network, and perform person Re-ID based on the ID network.

In one or more embodiments, the training module 13 is configured to take each piece of data in the data set and out-of-order data of each piece of data as positive sample data; and perform the unsupervised learning according to the positive sample data and the negative sample data of each piece of data.

In one or more embodiments, the training module 13 is further configured to save weights obtained by the unsupervised learning; and load the saved weights in response to performing person Re-ID using the ID network.

In one or more embodiments, the processing module 12 is configured to perform weighted fusion on features of each piece of data, features of corresponding out-of-order data of each piece of data, and central sample features to obtain the negative sample data corresponding to each piece of data.

In one or more embodiments, the processing module 12 may include a negative sample acquisition module; the negative sample acquisition module is configured to generate negative sample data corresponding to each piece of data according to the following formula:

$$f_i = \alpha \cdot f_i^{p} + \beta \cdot f_i^{I} + \eta \cdot f^{c};$$

$$f^{c} = \frac{1}{K}\sum_{i=1}^{K} f_i;$$

$$\alpha + \beta + \eta = 1;$$

$$\eta = \cos(iter/\text{sum\_iter}),$$

where i represents an $i^{th}$ piece of data; α, β, and η represent weight parameters;

$$f_i^{p}$$

represents data features of the $i^{th}$ piece of data;

$$f_i^{t}$$

represents data features of the out-of-order data of the $i^{th}$ piece of data; $f^c$ represents central sample features; $f_i$ represents negative sample data of the $i^{th}$ piece of data; iter represents the current number of iterations; sum_iter represents the total number of iterations; and K represents the amount of data for calculating the negative sample data.

In one or more embodiments, the training module 13 may include a loss function calculation module; the loss function calculation module is configured to calculate a loss function loss in an unsupervised learning process according to the following formula:

$$\text{loss} = -\sum_{i=1}^{Batchsize} \log \frac{\exp(f_i^{t} \cdot f_i^{p}/\tau)}{\exp(f_i^{t} \cdot f_i^{p}/\tau) + \sum_{k=1}^{K} \exp(f_i^{t} \cdot f_k/\tau)},$$

where Batchsize represents the amount of data used in every single iteration taken from the data set; k represents a $k^{th}$ piece of data in the first K pieces of data of the data used in the current iteration; $f_k$ represents the negative sample data of the $k^{th}$ piece of data in the first K pieces of data of the data used in the current iteration; and T represents a proportional parameter.

In one or more embodiments, the training module 13 is further configured to update, in response to the loss function being calculated, weights in the ID network by back-propagation of the loss function.

In one or more embodiments, the apparatus further includes a storage module; the storage module is configured to add the newly generated negative sample data to the contrastive sample queue after generating negative sample data corresponding to each piece of data based on each piece of data and the corresponding out-of-order data, the contrastive sample queue being a FIFO stack with a length of K.

In one or more embodiments, the storage module is configured to extract, in response to extracting one piece of data from one batch of data of the current iterative training, corresponding negative sample data from the contrastive sample queue, and delete the extracted negative sample data from the contrastive sample queue.

In one or more embodiments, the processing module 12 may include a blocking module; the blocking module is configured to perform block processing on each piece of data in the data set according to the height dimension of a person according to a preset proportion, whereby the head, upper limb, and lower limb of the person in the corresponding data are located at different blocks.

In one or more embodiments, the person Re-ID apparatus may further include a data augmentation module; the data augmentation module is configured to perform data augmentation processing on each piece of data in the data set before performing block processing on each piece of data in the data set.

In one or more embodiments, the person Re-ID apparatus may further include a screening module. The screening module is configured to: acquire loss values corresponding to the ID network in the latest preset number of training iterations, and calculate an average value of the loss values; extract, in response to determining that the average value is less than a preset threshold, data features of each piece of data in the data set using the ID network; perform clustering on the data features of each piece of data in the data set using mean shift clustering, and perform classification on the data in the data set based on results of the clustering; and determine an extracted probability of each piece of data in the data set based on results of the classification, and extract data from the data set based on the extracted probability to continue training the ID network.

In one or more embodiments, the screening module is configured to: determine the radius of a sliding window before starting sliding; calculate, in response to sliding to a new region, a mean within the sliding window as a central point, the number of points within the sliding window being a density within the sliding window; slide the sliding window until the density within the sliding window no longer increases; and retain, in response to a plurality of sliding windows overlapping, the sliding window containing the most data features, and perform clustering according to the sliding window to which the data features belong.

In one or more embodiments, the screening module may include a probability calculation module; the probability calculation module is configured to: calculate an extracted probability of each piece of data in the data set according to the following formula:

$$P_j = -\frac{1}{2}\log\left(1 - \frac{d_c^j}{D_c}\right),$$

where c represents a $c^{th}$ category obtained by classification; j represents a $j^{th}$ piece of data in the $c^{th}$ category; $P_j$ represents an extracted probability of the $j^{th}$ piece of data in the $c^{th}$ category; $D_c$ represents the distance between the data farthest away from a cluster center and the cluster center in the $c^{th}$ category; and $$d_c^j$$

represents the distance between the $j^{th}$ piece of data and the cluster center in the $c^{th}$ category; and normalize the calculated extracted probability of each piece of data in the data set.

Figure 9:
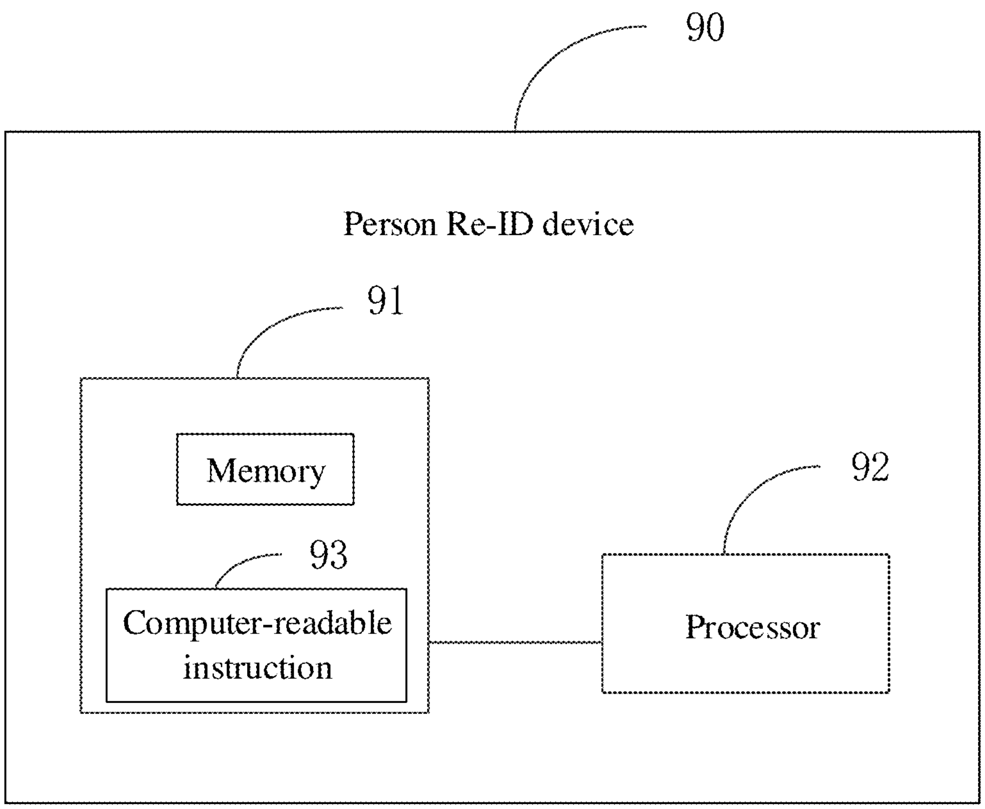
FIG. 9 is a structural diagram of a person Re-ID device provided by an embodiment of the present application.

Referring to FIG. 9, the embodiments of the present application further provide a person Re-ID device that may include a memory 91 and one or more processors 92, where:

the memory 91, configured to store computer-readable instructions 93; and the processors 92, configured to implement any step of the person Re-ID method as described above when executing computer-readable instructions 93.

Figure 10:
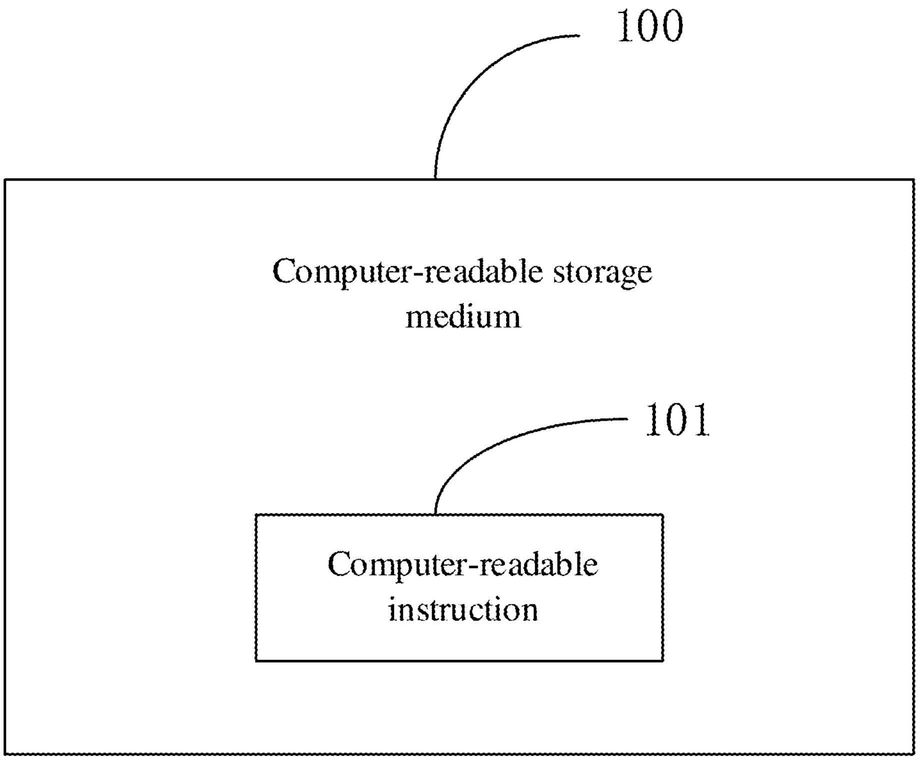
FIG. 10 is a structural diagram of a computer-readable storage medium provided by an embodiment of the present application.

Referring to FIG. 10, the embodiments of the present application further provide a computer-readable storage medium 100 storing thereon computer-readable instructions 101 that, when executed by the processors, implement any step of the person Re-ID method as described above.

It is to be noted that the description of the relevant parts of the person Re-ID apparatus and device, and the storage medium provided by the embodiments of the present application might be referred to the detailed description of the corresponding parts of the person Re-ID method provided by the embodiments of the present application, and will not be repeated here. In addition, the parts of the above technical solutions provided by the embodiments of the present application which are consistent with the implementation principles of corresponding technical solutions in the prior art are not described in detail so as not to redundantly describe.

It will be appreciated by the ordinarily skilled in the art that implementing all or part of the flow of the methods of the embodiments described above may be accomplished by instructing the associated hardware via computer-readable instructions, which may be stored on one or more non-volatile computer-readable storage media; the computer-readable instructions, when executed, may include the flow of the embodiments of the above methods. Any references to memory, storage, databases, or other media used in the embodiments provided by the present application may include a non-volatile and/or volatile memory. The non-volatile memory may include read-only memory (ROM), programmable ROM (PROM), electrically programmable ROM (EPROM), electrically erasable programmable ROM (EEPROM), or flash memory. The volatile memory may include random-access memory (RAM) or external cache. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), Rambus DRAM (RDRAM), direct Rambus DRAM (DRDRAM).

The previous description of the disclosed embodiments is provided to enable the skilled in the art to make or use the present application. Various modifications to these embodiments will be readily apparent to the skilled in the art, and the generic principles defined herein may be implemented in other embodiments without departing from the spirit or scope of the present application. Therefore, the present application will not be limited to these embodiments shown herein but will conform to the broadest scope consistent with the principles and novel features disclosed herein.

What is claimed is:

1. A person Re-identification (Re-ID) method, comprising:

acquiring a data set, wherein pieces of data in the data set are unlabeled person images;

performing block processing on each of the pieces of data in the data set to obtain blocked data, performing random ordering on each block of each piece of the blocked data to obtain out-of-order data corresponding to each of the pieces of data, and generating negative sample data corresponding to each of the pieces of data based on each of the pieces of data and the corresponding out-of-order data; and performing unsupervised learning based on each of the pieces of data in the data set, the corresponding out-of-order data of each of the pieces of data, and the negative sample data of each of the pieces of data to obtain a corresponding identification (ID) network, and performing person Re-ID based on the corresponding ID network, wherein the performing unsupervised learning based on each of the pieces of data in the data set, the corresponding out-of-order data of each of the pieces of data, and the negative sample data of each of the pieces of data comprises:

taking each of the pieces of data in the data set and the corresponding out-of-order data of each of the pieces of data as positive sample data; and performing the unsupervised learning according to the positive sample data and the negative sample data of each of the pieces of data.

2. The method according to claim 1, wherein after the obtaining a corresponding ID network, the method further comprises:

saving weights obtained by the unsupervised learning; and loading the saved weights in response to the performing person Re-ID based on the corresponding ID network.

3. The method according to claim 1, wherein the generating negative sample data corresponding to each of the pieces of data based on each of the pieces of data and the corresponding out-of-order data comprises:

performing weighted fusion on features of each of the pieces of data, features of the corresponding out-of-order data of each of the pieces of data, and central sample features to obtain the negative sample data corresponding to each of the pieces of data.

4. The method according to claim 1, wherein the generating negative sample data corresponding to each of the pieces of data based on each of the pieces of data and the corresponding out-of-order data comprises:

generating the negative sample data corresponding to each of the pieces of data according to following formulas:

$$f_i = \alpha \cdot f_i^p + \beta \cdot f_i^I + \eta \cdot f^c;$$

$$f^c = \frac{1}{K}\sum_{i=1}^{K} f_i;$$

$$\alpha + \beta + \eta = 1;$$

$$\eta = \cos(iter/\text{sum\_iter}),$$

wherein i represents an $i^{th}$ piece of data; α, β, and η represent weight parameters;

$$f_i^p$$

represents data features of the $i^{th}$ piece of data;

$$f_i^t$$

represents data features of the out-of-order data of the $i^{th}$ piece of data; $f^c$ represents central sample features; $f_i$ represents negative sample data of the $i^{th}$ piece of data; iter represents a current number of iterations; sum_iter represents a total number of iterations; and K represents an amount of data for calculating the negative sample data.

5. The method according to claim 1, wherein the performing unsupervised learning based on each of the pieces of data in the data set, the corresponding out-of-order data of each of the pieces of data, and the negative sample data of each of the pieces of data comprises:

calculating a loss function loss according to a following formula during the unsupervised learning:

$$\text{loss} = -\sum_{i=1}^{Batchsize} \log \frac{\exp(f_i^t \cdot f_i^p/\tau)}{\exp(f_i^t \cdot f_i^p/\tau) + \sum_{k=1}^{K}\exp(f_i^t \cdot f_k/\tau)},$$

wherein Batchsize represents an amount of data used in single iteration taken from the data set; k represents a $k^{th}$ piece of data in a first K pieces of data of data used in a current iteration; $f_k$ represents the negative sample data of the $k^{th}$ piece of data in the first K pieces of data of the data used in the current iteration; and τ represents a proportional parameter.

6. The method according to claim 5, further comprising: updating, in response to the loss function being calculated, weights in the corresponding ID network by back-propagation of the loss function.

7. The method according to claim 1, wherein after the generating negative sample data corresponding to each of the pieces of data based on each of the pieces of data and the corresponding out-of-order data, the method further comprises:

adding newly generated negative sample data to a contrastive sample queue.

8. The method according to claim 6, wherein the contrastive sample queue is a First-In-First-Out (FIFO) stack with a length of K.

9. The method according to claim 7, further comprising:

extracting, in response to extracting one piece of data from one batch of data of a current iterative training, corresponding negative sample data from the contrastive sample queue, and deleting an extracted negative sample data from the contrastive sample queue.

10. The method according to claim 1, wherein the performing block processing on each of the pieces of data in the data set comprises:

performing block processing on each of the pieces of data in the data set according to a height dimension of a person in the data and a preset proportion, whereby a head, an upper limb, and a lower limb of the person in the data are located at different blocks.

11. The method according to claim 1, wherein before the performing block processing on each of the pieces of data in the data set, the method further comprises:

performing data augmentation processing on each of the pieces of data in the data set.

12. The method according to claim 11, wherein the data augmentation processing comprises at least one of noise, rotation, blurring, or deduction.

13. The method according to claim 1, wherein after the obtaining a corresponding ID network, the method further comprises:

acquiring loss values corresponding to the corresponding ID network in a preset number of training iterations, and calculating an average value of the loss values;

extracting, in response to the average value being less than a preset threshold, data features of each of the pieces of data in the data set using the corresponding ID network;

performing clustering on the data features of each of the pieces of data in the data set using mean shift clustering, and performing classification on the data in the data set based on results of the clustering; and determining an extracted probability of each of the pieces of data in the data set based on results of the classification, and extracting data from the data set based on the extracted probability to continue training the corresponding ID network.

14. The method according to claim 13, wherein the performing clustering on the data features of each of the pieces of data in the data set using mean shift clustering comprises:

determining radius of sliding windows before starting sliding;

calculating, in response to sliding to a new region, a mean within a sliding window of the sliding windows as a central point, a number of points within the sliding window being a density within the sliding window;

sliding the sliding window until the density within the sliding window no longer increases; and retaining, in response to the sliding windows overlapping, a sliding window of the sliding windows containing the most data features, and performing clustering according to the sliding window to which the most data features belong.

15. The method according to claim 13, wherein the determining an extracted probability of each of the pieces of data in the data set based on results of the classification comprises:

calculating the extracted probability of each of the pieces of data in the data set according to a following formula:

$$P_j = -\frac{1}{2}\log\left(1 - \frac{d_c^j}{D_c}\right),$$

wherein c represents a $c^{th}$ category obtained by the classification; j represents a $j^{th}$ piece of data in the $c^{th}$ category; $P_j$ represents an extracted probability of the $j^{th}$ piece of data in the $c^{th}$ category; $D_c$ represents a distance between data farthest away from a cluster center and the cluster center in the $c^{th}$ category; and $$d_c^j$$

represents a distance between the $j^{th}$ piece of data and the cluster center in the $c^{th}$ category; and normalizing the extracted probability of each of the pieces of data in the data set.

16. The method according to claim 13, wherein the extracted probability of each of the pieces of data in the data set is proportional to a distance between each of the pieces of data and a cluster center of a category to which the piece of data belongs.

17. A person Re-identification (Re-ID) device, comprising:

a memory, configured to store computer-readable instructions; and a processor, configured to execute the computer-readable instructions, wherein upon execution of the computer-readable instructions, the processor is configured for:

acquiring a data set, wherein pieces of data in the data set are unlabeled person images;

performing block processing on each of the pieces of data in the data set to obtain blocked data, performing random ordering on each block of each piece of the blocked data to obtain out-of-order data corresponding to each of the pieces of data, and generating negative sample data corresponding to each of the pieces of data based on each of the pieces of data and the corresponding out-of-order data; and performing unsupervised learning based on each of the pieces of data in the data set, the corresponding out-of-order data of each of the pieces of data, and the negative sample data of each of the pieces of data to obtain a corresponding identification (ID) network, and performing person Re-ID based on the corresponding ID network;

wherein when performing unsupervised learning based on each of the pieces of data in the data set, the corresponding out-of-order data of each of the pieces of data, and the negative sample data of each of the pieces of data, the processor is configured for:

taking each of the pieces of data in the data set and the corresponding out-of-order data of each of the pieces of data as positive sample data; and performing the unsupervised learning according to the positive sample data and the negative sample data of each of the pieces of data.

18. A non-transitory computer-readable storage medium, storing computer-readable instructions executable by a processor, wherein upon execution by the processor, the computer-readable instructions are configured for:

acquiring a data set, wherein pieces of data in the data set are unlabeled person images;

performing block processing on each of the pieces of data in the data set to obtain blocked data, performing random ordering on each block of each piece of the blocked data to obtain out-of-order data corresponding to each of the pieces of data, and generating negative sample data corresponding to each of the pieces of data based on each of the pieces of data and the corresponding out-of-order data; and performing unsupervised learning based on each of the pieces of data in the data set, the corresponding out-of-order data of each of the pieces of data, and the negative sample data of each of the pieces of data to obtain a corresponding identification (ID) network, and performing person Re-ID based on the corresponding ID network;

wherein when performing unsupervised learning based on each of the pieces of data in the data set, the corresponding out-of-order data of each of the pieces of data, and the negative sample data of each of the pieces of data, the computer-readable instructions are configured for:

taking each of the pieces of data in the data set and the corresponding out-of-order data of each of the pieces of data as positive sample data; and performing the unsupervised learning according to the positive sample data and the negative sample data of each of the pieces of data.

19. The method according to claim 13, wherein the determining an extracted probability of each of the pieces of data in the data set based on results of the classification comprises:

traversing each of the pieces of data of each category to obtain a first distance of each category, wherein the first distance is a farthest distance between a cluster center of a category and data of the category, and calculating the extracted probability of each of the pieces of data of each category according to the first distance of each category.

* * * * *